H. C. BENSON.
Inkstand.

No. 217,256. Patented July 8, 1879.

Witnesses:

Inventor:
H. C. Benson

UNITED STATES PATENT OFFICE.

HENRY C. BENSON, OF NEW YORK, N. Y., ASSIGNOR TO JOSEPH RECKENDORFER, OF SAME PLACE.

IMPROVEMENT IN INKSTANDS.

Specification forming part of Letters Patent No. 217,256, dated July 8, 1879; application filed January 7, 1879.

*To all whom it may concern:*

Be it known that I, HENRY C. BENSON, of the city, county, and State of New York, have invented certain new and useful Improvements in Inkstands, of which the following is a specification.

My invention relates to inkstands adapted to contain a soluble coloring-matter which, in conjunction with water, will form a writing or marking fluid.

I am aware that various devices have been heretofore used for the purpose. The receptacle has usually contained a soluble coloring-matter and a filtering medium, such as a sponge or other suitable porous diaphragm, and this receptacle in some instances has been used with, and in other instances without, the ordinary dipping cone or funnel placed in the ink-well.

In all cases, however, of which I have knowledge the coloring-matter has been submerged entirely, or nearly so, in liquid whenever the receptacle has been supplied with the quantity of water needed in order to fit the device for use.

Under my invention the receptacle for the coloring-matter is raised above the fount or ink-well, with which it communicates, the arrangement of the parts being such that the liquid poured into the soluble coloring-matter receptacle will drain therefrom into the ink-well, leaving the former compartment practically free from liquid. Aniline colors, which I prefer to use, are so easily soluble to the extent requisite to give proper color to the writing-fluid that the water, in its short passage through the chamber that contains such coloring-matter, will be converted into excellent ink.

In order to bring the water more completely into contact with the coloring-matter, and also to prevent the latter from consolidating into a solid lump to clog or obstruct the passage to the ink-well, I prefer to hold the aniline in a divided state in sponge or other proper porous material, with which the coloring-matter receptacle should be well filled; and the receptacle itself I prefer to close at the top by a funnel provided with an aperture in its bottom, through which the water poured into the funnel can pass down into the receptacle below.

Figure 1:
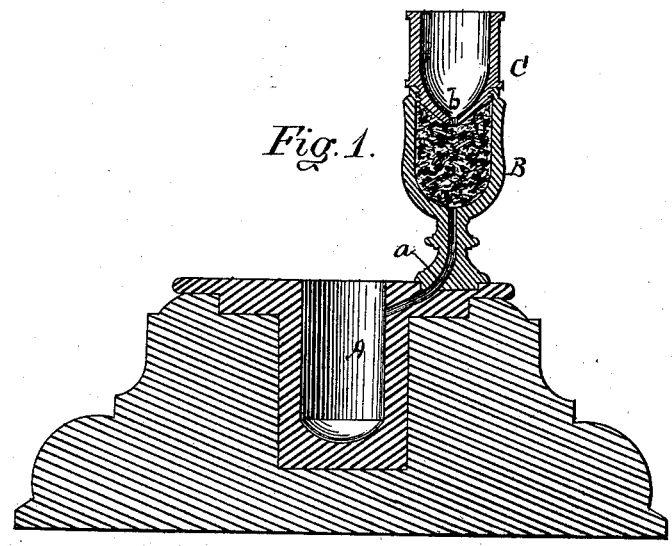
Figure 2:
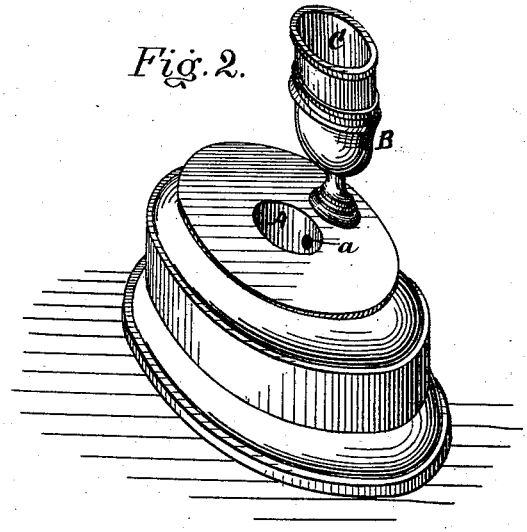

In the accompanying drawings, Figure 1 is a vertical central section of an inkstand embodying my invention. Fig. 2 is an isometrical perspective of the same.

A is an ink-well of ordinary or suitable construction. B is a small receptacle containing the soluble coloring-matter, (preferably aniline, either in crystals or made into composition, or in other proper condition,) which is scattered through or held in or upon sponge or other suitable porous material, with which the interior of the receptacle is filled, as shown. The receptacle is so placed as to be above the ordinary level of the fluid in the ink-well A, and communicates with said ink-well through a duct or conduit, $a$, so that water poured into the receptacle will drain therefrom into the ink-well.

I close the receptacle by a screw-cap or funnel, C, with an aperture, $b$, in its bottom, the bottom being preferably of conical form, as shown.

Water poured into the cap or funnel will pass through the aperture $b$ into the receptacle B. There it will be brought into contact with the coloring-matter, and, passing gradually through the sponge, will be led through the conduit $a$ into the ink-well A, where it will appear an ink.

The receptacle B need be of but small size— not larger than shown in the drawings. Even then it will contain aniline enough to make several gallons of writing-fluid. If desired, a number of receptacles B can be employed in conjunction with one ink-well, the receptacles containing soluble coloring-matter of different colors, so that ink of any desired color may be supplied to the ink-well by simply pouring water into the receptacle containing the proper coloring-matter.

The ink-well A need be of but small capacity—large enough only to contain the ink required at any one time; and in lieu of combining several receptacles B with a single ink-well, a number of receptacles with an ink-well for each receptacle may be combined and arranged in one base or stand.

Having described my invention, I would state in conclusion that I do not limit myself to the particular arrangement and construction of devices herein shown, for the same manifestly can be considerably varied without departure from my invention; but

What I claim, and desire to secure by Letters Patent, is—

1. The combination, substantially as set forth, with the ink-well, of a soluble coloring-matter receptacle provided with an opening at the top for admission of liquid, and elevated above, but communicating with, the ink-well, so that liquid poured into said receptacle shall at once and entirely drain therefrom into the ink-well.

2. In combination with the ink-well, the elevated receptacle packed with sponge or other porous material, holding or containing soluble coloring-matter, and provided with a conduit leading to the ink-well, substantially as set forth.

3. In combination with the ink-well and the coloring-matter receptacle, the funnel-cap closing the mouth of said receptacle, and provided with a communicating opening in its bottom, substantially as set forth.

In testimony whereof I have hereunto set my hand this 4th day of January, 1879.

HENRY C. BENSON.

Witnesses:
J. BRAISTED,
JOE W. SWAINE.